United States Patent
Harral et al.

(10) Patent No.: US 12,104,528 B1
(45) Date of Patent: Oct. 1, 2024

(54) FORCED AIR SUPPLY SYSTEM FOR ENGINE CAVITY UNDER NEGATIVE-G FORCE

(71) Applicant: Rolls-Royce North American Technologies Inc., Indianapolis, IN (US)

(72) Inventors: Jacob Harral, Indianapolis, IN (US); Michael Kabbes, Indianapolis, IN (US); Michael Dornfeld, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/314,892

(22) Filed: May 10, 2023

(51) Int. Cl.
 *F02C 7/06* (2006.01)

(52) U.S. Cl.
 CPC .............. *F02C 7/06* (2013.01); *F05D 2260/98* (2013.01)

(58) Field of Classification Search
 CPC .......... F02C 7/06; F01D 25/18; F01D 25/183; F05D 2260/98; F04C 2240/809; F16D 2048/0272; F16H 61/4104; F16H 61/4192; F01M 11/0408; F16N 2210/08; F16N 2210/09

See application file for complete search history.

(56) References Cited

U.S. PATENT DOCUMENTS

| | | | |
|---|---|---|---|
| 4,664,134 A * | 5/1987 | Pera | F02C 7/22 96/219 |
| 8,051,869 B2 * | 11/2011 | Parnin | F16K 17/36 137/1 |
| 9,765,643 B2 * | 9/2017 | Stutz | F16N 29/02 |

FOREIGN PATENT DOCUMENTS

GB         2225817 A  *  6/1990 ............. F01D 25/20

* cited by examiner

*Primary Examiner* — Todd E Manahan
*Assistant Examiner* — Sean V Meiller
(74) *Attorney, Agent, or Firm* — Barnes & Thornburg LLP

(57) ABSTRACT

A forced air supply system is provided to deliver forced air to fluid or a mixture of fluid and air in an enclosure of a cavity of a gas turbine engine when the gas turbine engine experiences a negative-gravity force event. Methods are also provided for removing fluid and/or air from the enclosure when the gas turbine engine experiences the negative-gravity force.

10 Claims, 5 Drawing Sheets

FORCED AIR SUPPLY SYSTEM FOR ENGINE CAVITY UNDER NEGATIVE-G FORCE

TECHNICAL FIELD

The present disclosure relates generally to machine components requiring removal of lubricant, and more specifically to systems and methods of removing lubricant from the machine during operating conditions.

BACKGROUND

Turbine engines are used in a wide variety of power and propulsion applications. Some applications may expose turbine engines to negative-gravity ("negative-g") forces. A negative-g force is an acceleration downward that produces a weight-force in a direction upward.

An oil sump is an enclosed cavity in a turbine engine where lubricant-wetted components will reside to receive the requisite cooling and lubrication. The oil sump removes lubricant via positive gravity, or through a suction pump ("scavenge pickup"), or through a combination thereof, to keep lubricant from accumulating in the cavity.

Exposure of a turbine engine to negative-g forces may make scavenging the lubricant difficult or impossible through conventional means, because the lubricant may pool on the top surface of the enclosed cavity, rather than the bottom surface, from which the scavenge pickup would ordinarily remove the lubricant. Under negative-g forces, lubricant may continue to build up in the cavity and may flood the cavity, leading to lubricant leaking out of the seals of the enclosed cavity and into the engine. A flooded cavity may lead to an excessive generation of heat, and other undesirable conditions.

There is a continuous demand for increases in durations of sustained negative-g forces for gas turbine engines. Accordingly, there remains a need for further contributions in this area of technology.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

Figure 1:
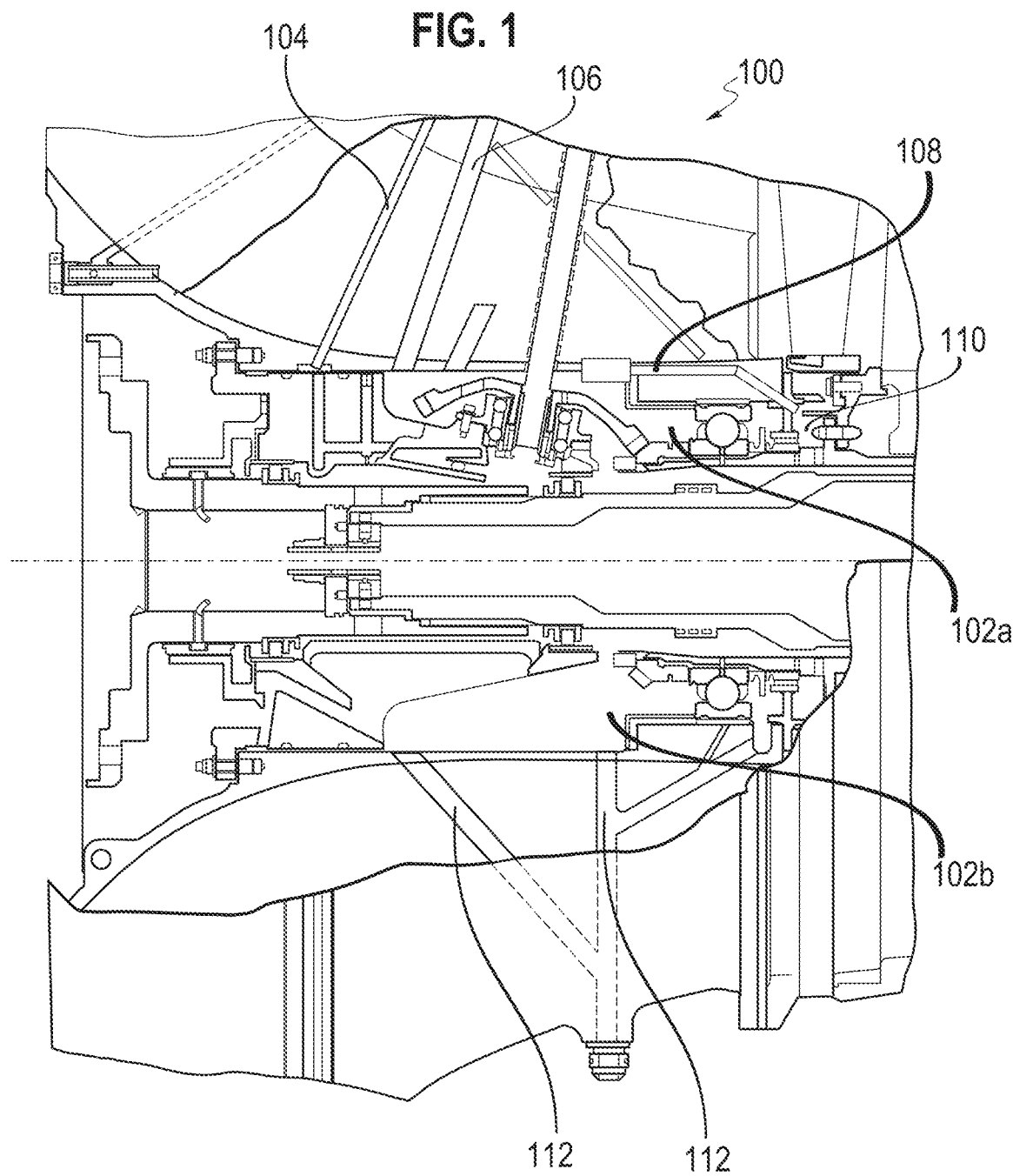
FIG. 1 illustrates a partial view of an example of a gas turbine engine.

The drawings described herein are for illustration purposes only and are not intended to limit the scope of the present disclosure in any way.

DETAILED DESCRIPTION

According to an example, present disclosure provides a forced air supply system for an oil sump of a gas turbine engine. The system includes a vent line fluidically connected to a vent in a surface of the oil sump, the vent sized and positioned in the oil sump to remove air, oil, or a mixture of air and oil from the oil sump during a negative gravity ("negative-g") force event, the surface being above an engine centerline when the gas turbine engine is operating at level flight. The system further includes an inlet in a second surface of the oil sump, the inlet in fluid communication with a forced air supply line to deliver forced air to the oil or the mixture in response to the gas turbine engine experiencing the negative-g force event. The system may include a valve in the forced air supply line. The valve may be a passive valve or an actuated valve. The valve may be a negative gravity valve or a gravity ball valve. The system may further include a negative-g sensor. The negative-g sensor may be in communication with a valve in the forced air supply line to transmit an indication of a presence or an absence of the negative-g force to the valve. The forced air supply line may be in fluid communication with a second inlet of a second oil sump to deliver forced air to oil or a second mixture of air and oil in the second oil sump in response to the gas turbine engine experiencing the negative g-force event.

According to another example, the present disclosure provides a forced air supply system for an enclosure of a cavity of a gas turbine engine. The system includes a vent line in fluid communication with a vent opening in a surface of the enclosure, the vent sized to receive air, oil, or a mixture of air and oil from the enclosure during a negative-gravity (negative-g) force event, the surface being above an engine centerline when the gas turbine engine is operating at level flight. The system further includes an inlet in a second surface of the enclosure, the inlet in fluid communication with a forced air supply line to deliver forced air to the oil or the mixture when the gas turbine engine experiences the negative-g force event. The system may further include a valve in the forced air supply line. The valve may be a passive valve or an actuated valve. The valve may be a negative gravity valve or a gravity ball valve. The enclosure may include a negative-g sensor. The negative-g sensor may be in communication with a valve in the forced air supply line to transmit an indication of a presence or an absence of the negative-g force to the valve. The forced air supply line may be in fluid communication with a second inlet of a second enclosure to deliver forced air to oil or a second mixture of air and oil in the second enclosure in response to the gas turbine engine experiencing the negative-g force event.

According to yet another example, the present disclosure provides a method for removing oil and/or air from an oil sump and/or gearbox of a gas turbine engine. The method includes opening an inlet in a surface of the oil sump to a flow of forced air into the oil sump when the gas turbine engine experiences a negative gravity (negative-g) force. The method further includes driving the oil and/or air out of the oil sump through a vent line with the forced air, the vent line in fluid communication with a vent in a second surface of the oil sump, the second surface being above an engine centerline when the gas turbine engine is operating at level flight. The opening may include opening a valve in a forced air supply line in fluid communication with the inlet. The valve may be a passive valve or an actuated valve. The opening the valve may further include: detecting an indication of a presence of the negative-g force; and transmitting the indication to the valve. The method may further include closing the inlet to the flow of forced air when the gas turbine engine does not experience the negative-g force. The closing may include: detecting an indication of an absence of the negative g-force; transmitting the indication to a valve in a forced air supply line in fluid communication with the inlet; and closing the valve.

An interesting feature of the apparatuses and methods described below may be that the forced air supply line provides additional secondary air into the oil sump while the gas turbine engine experiences negative-g force, which may help drive the lubricant or oil out through the vent and into the vent line, and reduce the risk of the oil sump being flooded with lubricant or oil. Alternatively, or in addition, an interesting feature of the apparatuses and methods described below may be that the small amount of air that leaks through the shaft seals and into the oil sump during normal operations will exit the sump cavity via the vent line or the oil scavenge.

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to FIG. 1, a partial view of an example of a gas turbine engine 100 is illustrated. Gas turbine engine includes enclosures of cavities 102a and 102b. Examples of enclosures of cavities 102a and 102b may include oil sumps. Conduit 104 is fluidically connected to the enclosure of cavity 102a and provides fluid to cavity 102a. Examples of fluids may include lubricants and oils and air. Vent line 106 is in fluid communication with a vent in the enclosure of cavity 102a. When gas turbine engine 100 is under positive gravitational force, vent line 106 removes air in cavity 102a that enters from cavity 110. Cavity 110 includes air that is under higher pressure than the air in cavity 102a. Cavity 110 can supply higher pressure air to cavity 102a by supply line 108, which may include a valve or other air flow control device or system. Cavity 102b is fluidically connected to drainage outlets 112, which may also be referred to as "scavenges." Drainage outlets 112, which may be molded into or otherwise formed in the enclosure of cavity 102b, converge at a junction point, and the junction point is fluidically connected to a suction pump. When gas turbine engine 100 is under positive gravitational force, fluids are removed from cavity 102b by drainage outlets 112.

Figure 2:
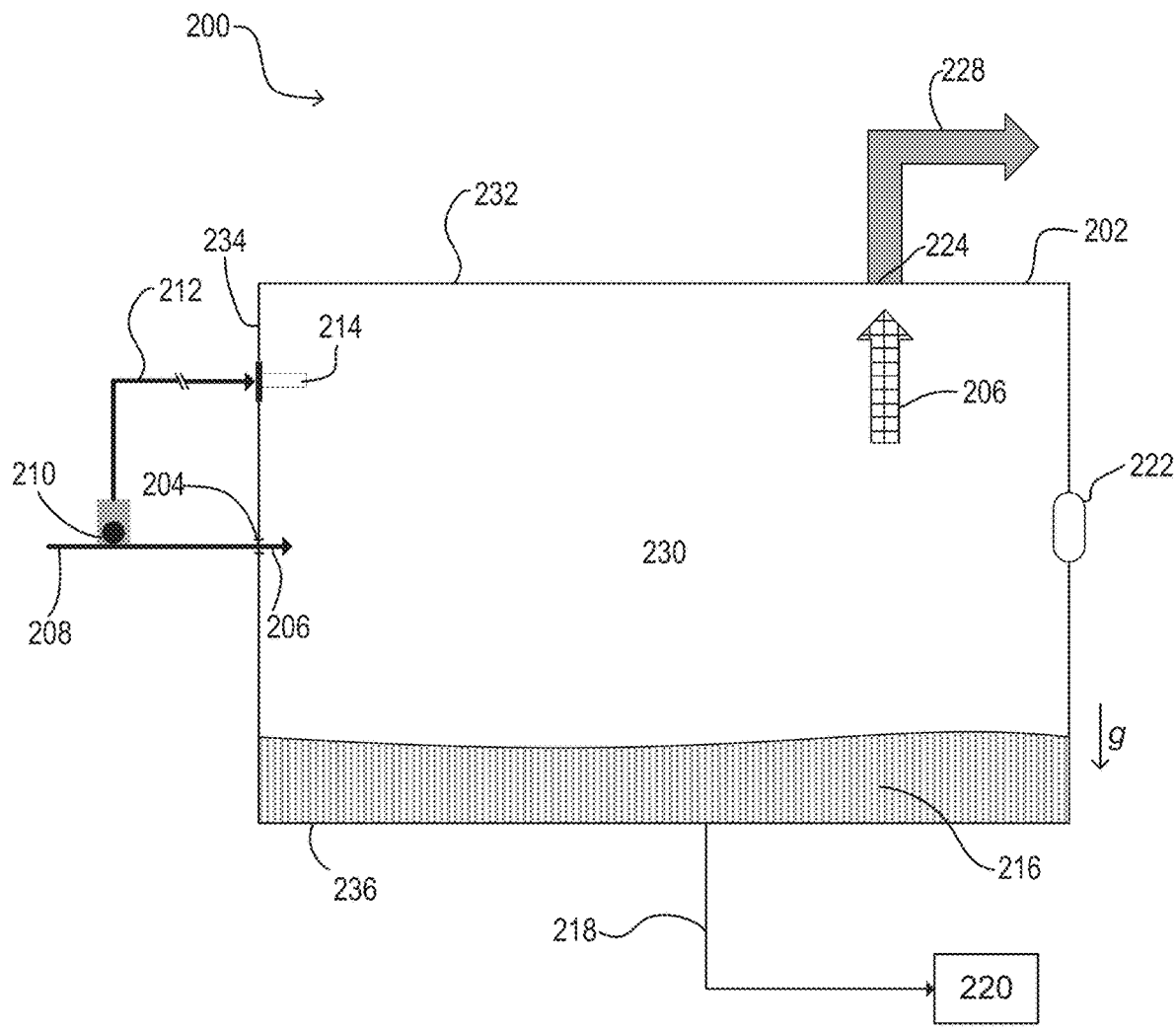
FIG. 2 illustrates a schematic of an example of a forced air supply system illustrating an enclosure of a cavity of a gas turbine engine under positive gravity force at a horizontal orientation, in accordance with the principles of the present disclosure.

Referring to FIG. 2, a schematic 200 of an example of a forced air supply system and an enclosure 202 of a cavity 230 of a gas turbine engine under positive gravity force (as represented in FIG. 2 by "1 g") at a horizontal orientation, which is substantially parallel to a surface of the earth, is illustrated. Under positive gravity force, objects experience a force of attraction generally towards the earth. Under positive gravity force, fluid 216 is kept within enclosure 202 by using a shaft seal 204 in enclosure 202 and using a source 208 of high-pressure air to ensure that the air pressure is higher outside enclosure 202. Consequently, a small amount of seal air 206 may leak through the shaft seal 204 and into cavity 230. It is understood that once seal air 206 enters into cavity 230, seal air 206 combines with lubricant and becomes an air/lubricant mist and is not seal air 206. Depending on the pressure and flow rate of seal air 206, the seal air 206 may be driven out of cavity 230 through vent 224 in a surface 232 of enclosure 202. At level flight under positive gravitational force, surface 232 is farthest from a surface of the earth. "Level flight" refers to aerial operation of the gas turbine engine at an orientation that is substantially horizontal and that is also substantially parallel to the surface of the earth.

Vent 224 is in fluid communication with vent line 228. Vent 224 is sized to remove fluid from cavity 230 when the gas turbine engine experiences a negative-gravity ("negative-g") force event. Under positive gravity force, fluid 216 in cavity 230 will be removed through drainage outlet 218 or "scavenge" that may be in fluid communication with suction pump 220. Drainage outlet 218 is positioned in bottom 236 of enclosure 202. Bottom 236 is a surface of enclosure 202 that is closest to a surface of the earth when the gas turbine engine is operating at level flight. Second surface 234, which is adjacent to surface 232, inlet 214, which is in fluid communication with forced air supply line 212. Forced air supply line 212 is in fluid communication with source 208. Forced air supply line 212 includes valve 210. As illustrated in FIG. 2, valve 210 is closed, thereby cutting off supply of forced air through forced air supply line 212 to inlet 214 and into cavity 230. Though not shown, forced air supply line 212 may be in fluid communication with a second inlet of a second cavity of the gas turbine engine, and further inlets of further cavities, wherein "further" refers to a third, a fourth, a fifth, or a higher ordinal number.

Valve 210 may be actuated on detection of the gravitational force acting on the gas turbine engine and change position or operation in response to changes in the gravitational force acting on the gas turbine engine, such as when the gas turbine engine experiences a negative-g force event. Examples of a valve 210 may include a passive valve or an actuated valve, such as a negative gravity valve, a gravity ball valve, or a ball float valve as described herein. Valve 210 may detect a gravitation force acting on the gas turbine engine. In other examples, valve 210 may be actuation controlled, such as with an electric signal from a controller and/or a gravitational sensor.

In the example of FIG. 2, enclosure 202 includes sensor 222, which may be a negative-g sensor that detects when a negative-g force is present. Sensor 222 may work cooperatively with valve 210 to transmit an indication of a presence of a negative-g force to valve 210, and valve 210 may change operation or position in response to the indication.

Figure 3:
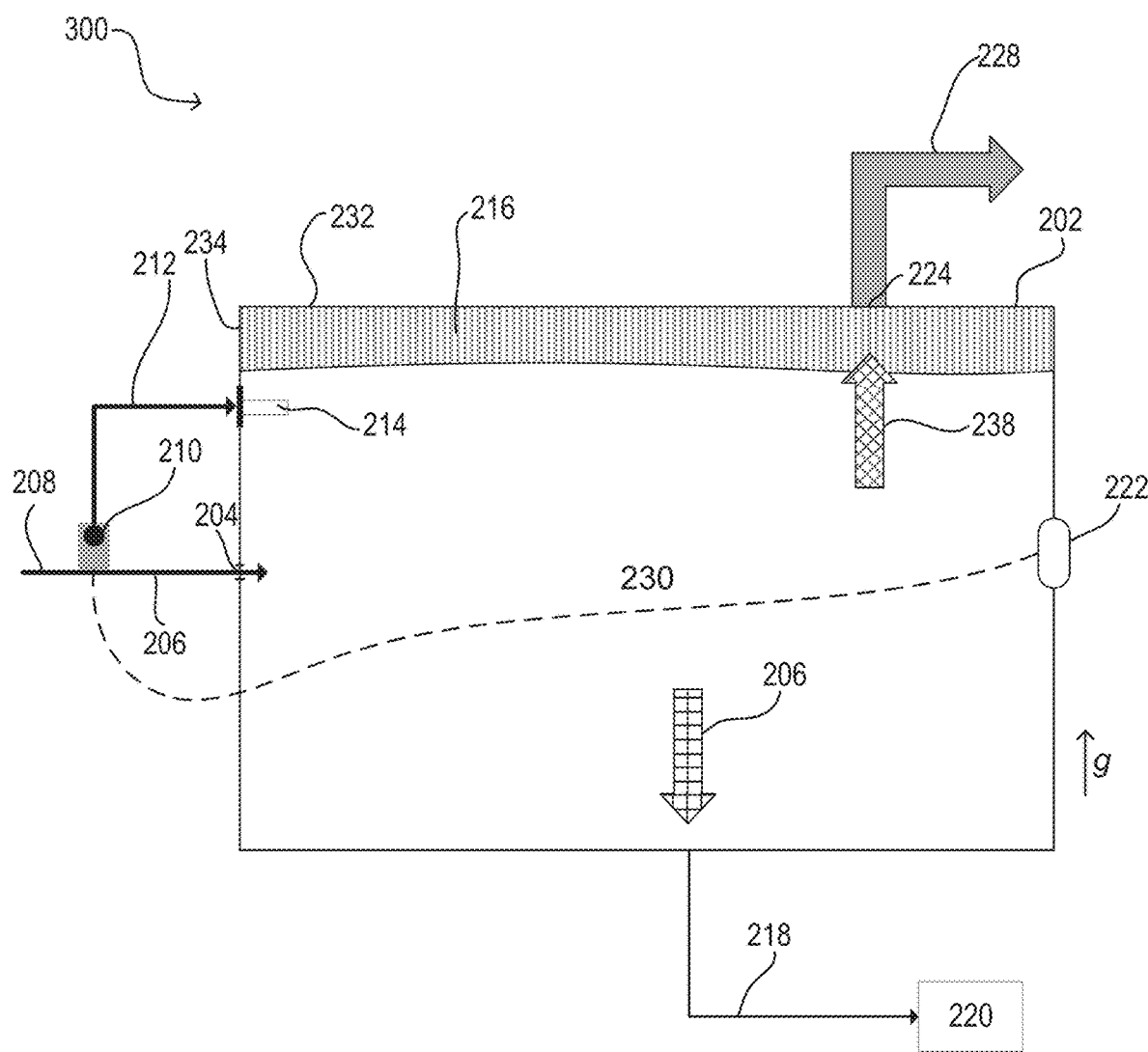
FIG. 3 illustrates a schematic of an example of an enclosure of a cavity of a gas turbine engine during a negative-g force event, in accordance with the principles of the present disclosure.

Referring to FIG. 3, a schematic 300 of an example of a forced air supply system and the enclosure 202 of cavity 230 of a gas turbine engine during a negative g-force event ("↑ g") is illustrated. Under negative g-force, removal of fluid 216 through drainage outlet 218 is difficult or impossible, and drainage outlet 218 may only pull out or extract seal air 206. Under these conditions, fluid 216 may continue to build up in cavity 230 at surface 232 and potentially flood cavity 230. Valve 210 changes operation and valve position in response to the presence of negative-g force, and will open to supply forced air supply line 212 with higher-pressure forced air from source 208 than can be supplied by shaft seal 204 leakage alone. Forced air 238 may enter cavity 230 through inlet 214. Inlet 214 may be angled relative to second surface 234 at a non-horizontal angle to improve getting fluid 216 out of cavity 230. By providing forced air 238 to cavity 230, the forced air 238 pushes fluid 216 through vent 224 and into vent line 228. Vent 224 is sized to receive fluid 216 optionally in a mixture with air, such that cavity 230 is vacated quickly and efficiently when valve 210 opens. Beneficially, the fluid 216 volume in cavity 230 is reduced during a negative g-force event, which reduces the risk of a flooded cavity 230.

Figure 4:
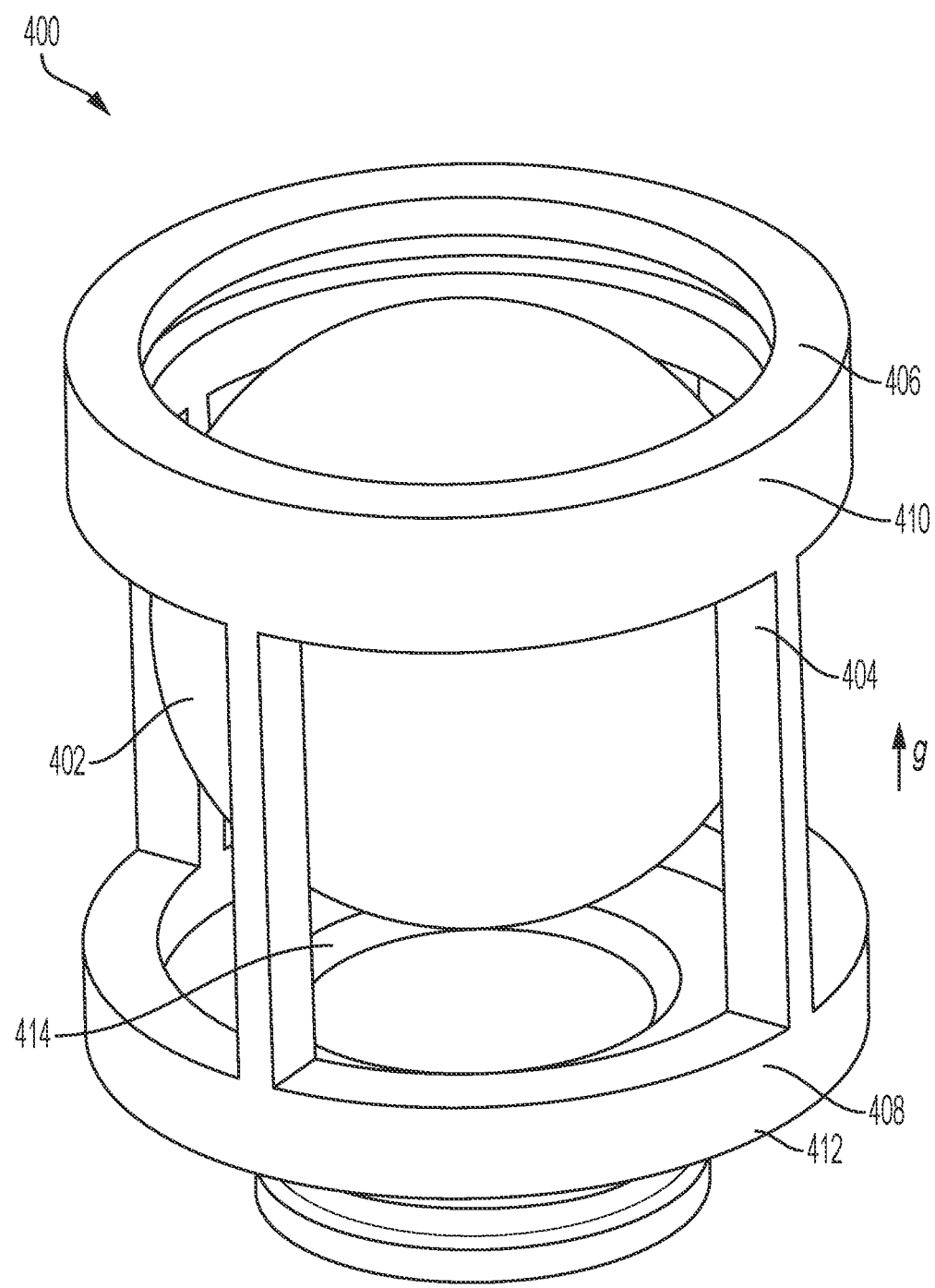
FIG. 4 illustrates a perspective view of an example of a valve, particularly a gravity ball valve, in accordance with the principles of the present disclosure.

Referring to FIG. 4, a perspective view of an example of valve 210, particularly a gravity ball valve 400, is illustrated. Gravity ball valve 400 includes housing 404, in which spherical element 402 may reversibly move between a top surface 406 of top ring 410 and seat 414 within bottom ring 408 in responses to changes in gravitational force. When the gas turbine engine is operating at level flight, top surface 406 is farthest from a surface of the earth, and bottom surface 412 of bottom ring 408 is closest to the surface of the earth. Top ring 410, bottom ring 408, and a plurality of struts 404 extending from top ring 410 to bottom ring 408 together form a cage that contains spherical element 402 within the cage. The plurality of struts 404 are long enough in length that spherical element may reversibly move between top ring 410 and seat 414. Spherical element 402 may be advantageously made of, include, or be coated with, a material that is heavier than air, such that in a negative g-force event as illustrated by the "-1 g" in FIG. 4, the spherical element 402 may move toward housing top 406, opening gravity ball valve 400 to source 208 of forced air 238 which may flow through forced air supply line 212 and inlet 214 into cavity 230. When the gas turbine engine does not experience negative-g force and is under positive gravitational force, represented by "1 g," spherical element 402 rests in seat 414 and blocks the flow of forced air 238 through forced air supply line 212.

The present disclosure also provides methods for removing fluid 216 and/or air from cavity 230 of enclosure 202, such as an oil sump, of a gas turbine engine. In an example, a method includes: opening inlet 214 in a surface of enclosure 202 to a flow of forced air 212 into cavity 230 when the gas turbine engine experiences a negative-g force; and driving fluid 216 and/or air out of cavity 230 through vent line 228 with forced air 238, vent line 228 fluidically connected to vent 224 in the surface of enclosure 202. In certain examples, the opening may include opening valve 210 in forced air supply line 212 that is fluidically connected to inlet 214. In other examples, opening of valve 210 may include detecting an indication of a presence of the negative-g force; and transmitting the indication to valve 210.

In certain examples, a method may further include closing inlet 214 to the flow of forced air 238 when the gas turbine engine does not experience the negative-g force. In other examples, the closing may include detecting an indication of an absence of the negative-g force; transmitting the indication to valve 210 in forced air supply line 212; and closing valve 210.

Figure 5:
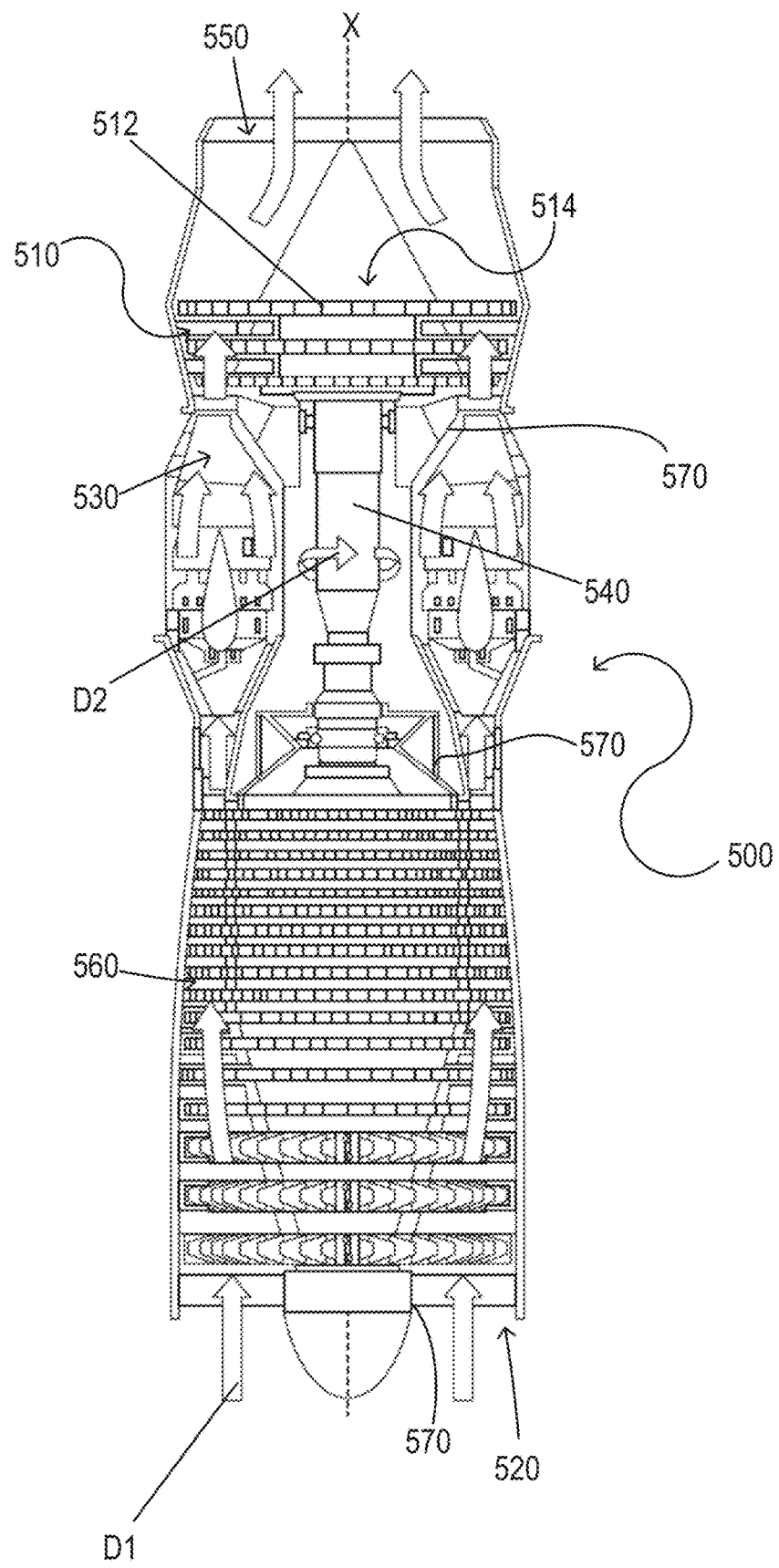
FIG. 5 illustrates a cross-sectional view of a gas turbine engine.

Referring to FIG. 5, a cross-sectional view of a gas turbine engine 500 is illustrated. In some examples, gas turbine engine 500 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively, or in addition, gas turbine engine 500 may be utilized in a configuration unrelated to an aircraft such as, for example, an industrial application, an energy application, a power plant, a pumping set, a marine application (for example, for naval propulsion), a weapon system, a security system, a perimeter defense, or security system.

Gas turbine engine 500 may take a variety of forms in various embodiments. Though depicted as an axial flow engine, in some forms gas turbine engine 500 may have multiple spools and/or may be a centrifugal or mixed centrifugal/axial flow engine. In some forms, gas turbine engine 500 may be a turboprop, a turbofan, a turbo generator, or a turboshaft engine. Furthermore, gas turbine engine 500 may be an adaptive cycle and/or variable cycle engine. Other variations are also contemplated.

Gas turbine engine 500 may include intake section 520, compressor section 560, combustion section 530, turbine section 510, and exhaust section 550. During operation of gas turbine engine 500, fluid received from intake section 520, such as air, travels along direction D1 and may be compressed within compressor section 560. The compressed fluid may then be mixed with fuel and the mixture may be burned in combustion section 530. Combustion section 530 may include any suitable fuel injection and combustion mechanisms. The hot, high pressure fluid may then pass through turbine section 510 to extract energy from the fluid and cause a turbine shaft of turbine 514 in turbine section 510 to rotate, which in turn drives compressor section 560. Discharge fluid may exit exhaust section 550.

As noted above, the hot, high pressure fluid passes through turbine section 510 during operation of gas turbine engine 500. As the fluid flows through turbine section 510, the fluid passes between adjacent blades 512 of turbine 514 causing turbine 514 to rotate. Rotating turbine 514 may turn shaft 540 in rotational direction D2, for example. Blades 512 may rotate around an axis of rotation, which may correspond to centerline X of turbine 514 in some examples. Liquid such as lubricant may pool in enclosures 570 of cavities in various locations in gas turbine engine 500. Examples of enclosures 570 may include oil sumps.

The term "aft," as used herein, unless stated otherwise, alone or in combination with other terms, refers to an element, surface, or assembly being situated at, near, or toward a tail of an aircraft or other vehicle. The term "aft" may be distinguished from the term "forward," which, as used herein, unless stated otherwise, alone or in combination with other terms, refers to an element, surface, or assembly being situated at, near, or toward a front of an aircraft or other vehicle. The forward and aft directions may refer to opposite directions along an axis, which may be parallel to, or identical to, a centerline of a gas turbine engine. The terms "axial" and "axially," as used herein, unless stated otherwise, alone or in combination with other terms, refers to elements, surfaces, and assemblies along a common axis, which may be forward or aft relative to other elements, surfaces, and/or assemblies.

A gas turbine engine may be annular. The terms "radially" and "radial," as used herein, unless stated otherwise, alone or in combination with other terms, refer to elements, surfaces, or assemblies relative to one another along a radius that may project perpendicularly from a centerline axis, which may parallel to, or identical to, a centerline of a gas turbine engine and/or a forward-aft axis. The terms "inward" and "inwardly," as used herein, unless stated otherwise, alone or in combination with other terms, refer to an element, surface, or assembly being situated at, near, or toward the centerline axis along a radius. The terms "outward" and "outwardly," as used herein, unless stated otherwise, alone or in combination with other terms, refer to an element, surface, or assembly being situated, or facing away from, the centerline axis along a radius. The terms "inward" and "inwardly" and the terms "outward" and "outwardly" may refer to opposite directions along a radius projecting perpendicularly from the centerline axis.

The terms "circumferential" and "circumferentially," as used herein, unless stated otherwise, alone or in combination with other terms, refer to elements, surfaces, or assemblies relative to one another encircling a centerline axis at a radius. Alternatively, or in addition, the terms "circumferential" and "circumferentially," as used herein, unless stated otherwise, alone or in combination with other terms, mean relating to a circumference of a circle centered on, and perpendicular to, a centerline axis.

The term "fluidically connected" refers to an attachment together of components or elements along a sealed path so as to allow a fluid to flow between the components or elements along the sealed path without inadvertent leakage of the fluid at any attachment point between components or elements.

For the purpose of this disclosure, the terms "about" and "substantially" are used herein with respect to measurable values and ranges due to expected variations known to those skilled in the art (for example, limitations and variability in measurements).

In describing elements of the present disclosure, the ordinal number terms "$1^{st}$," "$2^{nd}$," "first," "second," and the like, may be used herein. These ordinal number terms are only used to distinguish one element from another element, but do not limit the corresponding elements irrespective of the nature or order of the corresponding elements.

All methods and operations described herein may be performed in any suitable order unless otherwise indicated herein or otherwise clearly contradicted by context.

The term "negative-g force" refers to a negative gravity force, or an acceleration downward towards a planetary surface that produces a weight-force in a direction upward away from the planetary surface.

The uses of the terms "a" and "an" and "the" and similar referents in the context of describing the present disclosure (especially in the context of the following claims) are to be construed to cover both the singular and the plural, unless otherwise indicated herein or clearly contradicted by context. The use of the term "plurality of" is defined by the Applicant in the broadest sense, superseding any other implied definitions or limitations hereinbefore or hereinafter unless expressly asserted by Applicant to the contrary, to mean a quantity of more than one.

As used herein the terms "comprise(s)," "include(s)," "having," "has," "can," "contain(s)," and variants thereof, are intended to be open-ended transitional phrases, terms, or words that do not preclude the possibility of additional acts or structures. The present description also contemplates other examples "comprising," "consisting," and "consisting essentially of," the examples or elements presented herein, whether explicitly set forth or not.

While various examples have been described, it will be apparent to those of ordinary skill in the art that many more implementations are possible. Accordingly, the examples described herein are not the only possible implementations.

The subject-matter of the disclosure may also relate, among others, to the following aspects:

A first aspect relates to a forced air supply system for an oil sump of a gas turbine engine, the system comprising: a vent line fluidically connected to a vent in a surface of the oil sump, the vent sized and positioned in the oil sump to remove air, oil, or a mixture of air and oil from the oil sump during a negative-gravity (negative-g) force event, the surface being above an engine centerline when the gas turbine engine is operating at level flight; and an inlet in a second surface of the oil sump, the inlet in fluid communication with a forced air supply line to deliver forced air to the oil sump in response to the gas turbine engine experiencing the negative-g force event.

A second aspect relates to the forced air supply system of aspect 1, comprising a valve in the forced air supply line.

A third aspect relates to the forced air supply system of aspect 2, wherein the valve is a passive valve or an actuated valve.

A fourth aspect relates to the forced air supply system of aspect 3, wherein the valve is a negative gravity valve or a gravity ball valve.

A fifth aspect relates to the forced air supply system of any preceding aspect, further comprising a negative-g sensor.

A sixth aspect relates to the forced air supply system of aspect 5, wherein the negative-g sensor is in communication with a valve in the forced air supply line to transmit an indication of a presence or an absence of the negative-g force to the valve.

A seventh aspect relates to the forced air supply system of any preceding aspect, wherein the forced air supply line is in fluid communication with a second inlet of a second oil sump to deliver forced air to the second oil sump in response to the gas turbine engine experiencing the negative-g force event.

An eighth aspect relates to a forced air supply system for an enclosure of a cavity of a gas turbine engine, the system comprising: a vent line in fluid communication with a vent opening in a surface of the enclosure, the vent sized to receive air, oil, or a mixture of air and oil from the enclosure during a negative-gravity (negative-g) force event, the surface being above an engine centerline when the gas turbine engine is operating at level fight; and an inlet in a second surface of the enclosure, the inlet in fluid communication with a forced air supply line to deliver forced air to the enclosure when the gas turbine engine experiences the negative-g force event.

A ninth aspect relates to the forced air supply system of aspect 8, further comprising a valve in the forced air supply line.

A tenth aspect relates to the forced air supply system of aspect 9, wherein the valve is a passive valve or an actuated valve.

An eleventh aspect relates to the forced air supply system of aspect 10, wherein the valve is a negative gravity valve or a gravity ball valve.

A twelfth aspect relates to the forced air supply system of any of aspects 8 to 11, wherein the enclosure comprises a negative-g sensor.

A thirteenth aspect relates to the forced air supply system of aspect 12, wherein the negative-g sensor is in communication with a valve in the forced air supply line to transmit an indication of a presence or an absence of the negative-g force to the valve.

A fourteenth aspect relates to the forced air supply system of any of aspects 8 to 13, wherein the forced air supply line is in fluid communication with a second inlet of a second enclosure to deliver forced air to the second enclosure in response to the gas turbine engine experiencing the negative-g force event.

A fifteenth aspect relates to a method for removing oil and/or air from an oil sump of a gas turbine engine, the method comprising: opening an inlet in a surface of the oil sump to a flow of forced air into the oil sump when the gas turbine engine experiences a negative gravity (negative-g)

force; and driving the oil and/or air out of the oil sump through a vent line with the forced air, the vent line in fluid communication with a vent in a second surface of the oil sump, the second surface being above an engine centerline when the gas turbine engine is operating at level flight.

A sixteenth aspect relates to the method of aspect 15, wherein the opening comprises: opening a valve in a forced air supply line in fluid communication with the inlet.

A seventeenth aspect relates to the method of aspect 16, wherein the valve is a passive valve or an actuated valve.

An eighteenth aspect relates to the method of aspect 16, wherein the opening the valve further comprises: detecting an indication of a presence of the negative-g force; and transmitting the indication to the valve.

A nineteenth aspect relates to the method of any of aspects 15 to 18, further comprising: closing the inlet to the flow of forced air when the gas turbine engine does not experience the negative-g force.

A twentieth aspect relates to the method of aspect 19, wherein the closing comprises: detecting an indication of an absence of the negative-g force; transmitting the indication to a valve in a forced air supply line in fluid communication with the inlet; and closing the valve.

In addition to the features mentioned in each of the independent aspects enumerated above, some examples may show, alone or in combination, the optional features mentioned in the dependent aspects and/or as disclosed in the description above and shown in the figures.

What is claimed is:

1. A forced air supply system for an oil sump of a gas turbine engine, the system comprising:
    a vent line fluidically connected to a vent in a surface of the oil sump, the vent sized and positioned in the oil sump to remove air, oil, or a mixture of air and oil from the oil sump during a negative-gravity ("negative-g") force event, the surface being above an engine centerline when the gas turbine engine is operating at level flight;
    an inlet in a second surface of the oil sump, the inlet in fluid communication with a forced air supply line to deliver forced air to the oil sump in response to the gas turbine engine experiencing the negative-g force event;
    a valve in the forced air supply line; and
    a negative-g sensor in communication with the valve in the forced air supply line to cause the valve to open in response to an indication of a presence of the negative-g force event.

2. The forced air supply system of claim 1, wherein the valve is an actuated valve.

3. The forced air supply system of claim 1, wherein the forced air supply line is in fluid communication with a second inlet of a second oil sump to deliver forced air to the second oil sump in response to the gas turbine engine experiencing the negative-g force event.

4. A forced air supply system for an enclosure of a cavity of a gas turbine engine, the system comprising:
    a vent line in fluid communication with a vent opening in a surface of the enclosure, the vent sized to receive air, oil, or a mixture of air and oil from the enclosure during a negative-gravity ("negative-g") force event, the surface being above an engine centerline when the gas turbine engine is operating at level flight; and
    an inlet in a second surface of the enclosure, the inlet in fluid communication with a forced air supply line to deliver forced air to the enclosure when the gas turbine engine experiences the negative-g force event;
    a valve in the forced air supply line; and
    a negative-g sensor in communication with the valve in the forced air supply line to cause the valve to open in response to an indication of a presence of the negative-g force event.

5. The forced air supply system of claim 4, wherein the valve is an actuated valve.

6. The forced air supply system of claim 4, wherein the forced air supply line is in fluid communication with a second inlet of a second enclosure to deliver forced air to the second enclosure in response to the gas turbine engine experiencing the negative-g force event.

7. A method for removing oil and/or air from an oil sump of a gas turbine engine, the method comprising:
    detecting a presence of a negative-g force event;
    transmitting an indication of the negative-g force event to a valve in a forced air supply in fluid communication with an inlet in a surface of the oil sump;
    opening the valve in the forced air supply line to allow a flow of forced air into the oil sump through the inlet when the gas turbine engine experiences a negative gravity ("negative-g") force; and
    driving the oil and/or air out of the oil sump through a vent line with the forced air, the vent line in fluid communication with a vent in a second surface of the oil sump, the second surface being above an engine centerline when the gas turbine engine is operating at level flight.

8. The method of claim 7, wherein the valve is an actuated valve.

9. The method of claim 7, further comprising:
    closing the inlet to the flow of forced air when the gas turbine engine does not experience the negative-g force.

10. The method of claim 9, wherein the closing comprises:
    detecting an indication of an absence of the negative-g force;
    transmitting the indication to the valve in a forced air supply line in fluid communication with the inlet; and
    closing the valve.

* * * * *